US012753823B2

(12) United States Patent
Chasen et al.

(10) Patent No.: US 12,753,823 B2
(45) Date of Patent: Oct. 6, 2026

(54) ACTIVE CREW SEAT VIBRATION CONTROL

(71) Applicant: Lockheed Martin Corporation, Bethesda, MD (US)

(72) Inventors: Scott A. Chasen, Orange, CT (US); Michael Robert Monico, Hamden, CT (US)

(73) Assignee: Lockheed Martin Corporation, Bethesda, MD (US)

( * ) Notice: Subject to any disclaimer, the term of this patent is extended or adjusted under 35 U.S.C. 154(b) by 79 days.

(21) Appl. No.: 18/747,001

(22) Filed: Jun. 18, 2024

(65) Prior Publication Data

US 2025/0383008 A1 Dec. 18, 2025

(51) Int. Cl.
*F16F 15/027* (2006.01)
*B64C 27/10* (2023.01)
(Continued)

(52) U.S. Cl.
CPC .......... *F16F 15/0275* (2013.01); *B64D 11/06* (2013.01); *F16F 15/002* (2013.01); *B60N 2/522* (2013.01); *B64C 27/10* (2013.01); *F16F 2222/12* (2013.01); *F16F 2228/066* (2013.01); *F16F 2230/08* (2013.01); *F16F 2230/18* (2013.01)

(58) Field of Classification Search
CPC ......... B64C 27/10; B60N 2/522; B64D 11/06; F16F 15/0275; F16F 2222/12; F16F 2228/066; F16F 15/002; F16F 2230/08; F16F 2230/18
See application file for complete search history.

(56) References Cited

U.S. PATENT DOCUMENTS 5,054,145 A * 10/1991 Tsuchiya ................ B60N 2/527 5/655.5
5,294,085 A * 3/1994 Lloyd .................... B60N 2/522 248/550
(Continued)

FOREIGN PATENT DOCUMENTS

CN 110748601 A 2/2020

OTHER PUBLICATIONS

Sojoy Inflatable Seat Cushion Portable Travel Cushion for Airplane Bleacher Stadium Chair, Sojoy, Amazon.com, publicly available prior to Jun. 18, 2024 (1 page).
(Continued)

*Primary Examiner* — Milton Nelson, Jr.
(74) *Attorney, Agent, or Firm* — Michael Best & Friedrich LLP

(57) ABSTRACT

A vibration canceling system for an aircraft includes a vibration canceling structure having a first surface opposite a second surface and a cavity between the first surface and the second surface. The cavity contains a substantially incompressible fluid. The system includes a force generator configured to transmit forces to the substantially incompressible fluid to move the first surface relative to the second surface and a sensor positioned at the first surface. The sensor is configured to sense a motion of the first surface. The system includes a controller configured to control the force generator to transmit a first force to the substantially incompressible fluid to move the first surface out of phase with the sensed motion.

20 Claims, 4 Drawing Sheets

(51) Int. Cl.

| | |
|---|---|
| ***B64D 11/06*** | (2006.01) |
| ***F16F 15/00*** | (2006.01) |
| *B60N 2/52* | (2006.01) |

(56) References Cited

U.S. PATENT DOCUMENTS

| | | | | |
|---|---|---|---|---|
| 5,836,547 | A | 11/1998 | Koch et al. | |
| 7,822,522 | B2 | 10/2010 | Wereley et al. | |
| 11,584,519 | B2 * | 2/2023 | Smith | F16F 15/027 |
| 11,680,618 | B2 * | 6/2023 | Kawecki | B64D 11/0619 297/216.13 |
| 11,685,530 | B1 | 6/2023 | Fagan et al. | |
| 2020/0039316 | A1 * | 2/2020 | Belter | B60G 17/0195 |
| 2021/0047043 | A1 | 2/2021 | Black et al. | |

OTHER PUBLICATIONS

"TETON Sports Camping Seat Cushion; Stadium Seat; Office Chair; Car Pad; Inflatable", TETON Sports, Amazon, publicly available as early as Oct. 3, 2012 (11 pages). <https://www.amazon.com/TETON-Sports-Camping-Inflatable-1-5-Inch/dp/B009L1MXE0>.

"Inflatable Car Lumbar Support Pillow, Breathable fabric Ergonomic Backrest, Adjustable Air volume to Suit Personal Habits and Back Contours for Back Pain Relief Car Seat Lumbar Cushion. (Black)", Taajovs, publicly available as early as May 25, 2022 (9 pages). <https://www.amazon.com/Inflatable-Breathable-Ergonomic-Adjustable-Contours/dp/ BOB27FZZXM>.

* cited by examiner

ACTIVE CREW SEAT VIBRATION CONTROL

FIELD

The present disclosure relates to aircraft seating systems and, more particularly, to modular vibration control systems for aircraft seating systems.

BACKGROUND

Aircraft, such as propeller-driven fixed-wing aircraft and rotary-wing aircraft such as helicopters generate vibrations due to a variety of design-related factors. For example, the propellers of propeller-driven aircraft and the main rotors and tail rotors of helicopters may generate vibrations through several mechanisms. Aircraft propellers may produce thrust and experience torque as they rotate. These forces may not be constant across the blade's rotation due to variations in air density, blade angle (for example, with respect to the to the relative wind), and propeller speed. These fluctuations in thrust and torque may generate vibrations at the propeller, which can be transmitted from the propeller to the airframe. Worn or improperly aligned propellers can also lead to aerodynamic imbalances, which create unequal forces on different parts of the propeller, also leading to vibrations. Propeller blades can also flex under load from aerodynamic forces. This flexing may vary with the speed of the propeller's rotation and air density, causing further vibrations. As they rotate, individual propeller blades also move through the wake of preceding blades, causing periodic changes in aerodynamic loading. This wake interaction can generate additional cyclical vibration patterns.

Similarly, helicopter main rotor blades generate lift and drag as they rotate. Because the amount of lift and drag changes as the blades rotate (especially during maneuvers), the main rotor blades may experience uneven forces and generate vibrations. The period passing of each rotor blade at a given point may also create pulsating aerodynamic forces that result in significant vibrations. Furthermore, individual rotor blades passing through vortices shed by preceding blades can experience sudden changes in the aerodynamic loading of the blade, which can also produce vibrations. Main rotor blades may also flex and twist under aerodynamic loading, particularly during maneuvers or in changing wind conditions. These dynamic deformations can also cause vibrations. Helicopter tail rotors may operate in complex airflow affected by the main rotor, leading to variable aerodynamic loads on the blades and resultant vibrations. In flight, the advancing and retreating blades of the main rotor and the tail rotor may experience different airspeeds and aerodynamic loads. These differences can result in further vibrations.

SUMMARY

A vibration canceling system for an aircraft includes a vibration canceling structure having a first surface opposite a second surface and a cavity between the first surface and the second surface. The cavity contains a substantially incompressible fluid. The system includes a force generator configured to transmit forces to the substantially incompressible fluid to move the first surface relative to the second surface and a sensor positioned at the first surface. The sensor is configured to sense a motion of the first surface. The system includes a controller configured to control the force generator to transmit a first force to the substantially incompressible fluid to move the first surface out of phase with the sensed motion.

In other features, the system includes a reservoir fluidly coupled to the cavity, the reservoir including a portion of the substantially incompressible fluid. The force generator is configured to transmit forces to the substantially incompressible fluid within the reservoir. In other features, the system includes a piston disposed within the reservoir. The force generator is configured to drive the piston to transmit forces to the substantially incompressible fluid within the reservoir. In other features, the reservoir is fluidly coupled to the cavity via a fluid channel. In other features, the system includes a support layer. The vibration canceling structure is configured to be positioned between the support layer and an occupant of the aircraft.

In other features, the controller is configured to generate a transfer function based on a feedback signal from the sensor. In other features, the transfer function shifts a phase of the feedback signal. In other features, the controller is configured to apply the transfer function to the accelerometer signal to generate a phased signal. In other features, the controller is configured to control the force generator according to the phased signal. The phased signal includes at least one of a single-frequency signal and a multi-frequency signal. In other features, the feedback signal includes a range of frequencies indicative of vibration generated by components of the aircraft.

A method for canceling vibrations of an aircraft includes sensing, at a sensor, motion at an occupant-facing surface of a vibration canceling system and controlling, with the controller, a force generator to move the occupant-facing surface of the vibration canceling system out of phase with the sensed motion. The vibration canceling system includes a vibration canceling structure having a first surface opposite a second surface and a cavity between the first surface and the second surface. The occupant-facing surface is the first surface, the cavity contains a substantially incompressible fluid, the force generator is configured to transmit forces to the substantially incompressible fluid to move the first surface relative to the second surface, and the sensor is positioned at the first surface.

In other features, the vibration canceling system includes a reservoir fluidly coupled to the cavity. The reservoir including a portion of the substantially incompressible fluid. The force generator is configured to transmit forces to the substantially incompressible fluid within the cavity. In other features, the vibration canceling system includes a piston disposed within the reservoir. The force generator is configured to drive the piston to transmit forces to the substantially incompressible fluid within the reservoir. In other features, the reservoir is fluidly coupled to the cavity via a fluid channel. In other features, the vibration canceling system includes a support layer and the vibration canceling structure is configured to be positioned between the support layer and an occupant of the aircraft.

In other features, the method includes generating, at the controller, a transfer function based on a feedback signal from the sensor. In other features, the transfer function shifts a phase of the feedback signal. In other features, the method includes applying, at the controller, the transfer function to the feedback signal to generate a phased signal. In other features, the method includes controlling, at the controller, the force generator according to the phased signal. The phased signal includes at least one of a single-frequency signal and a multi-frequency signal. In other features, the feedback signal includes a range of frequencies indicative of vibration generated by components of the aircraft.

Other examples, embodiments, features, and aspects will become apparent by consideration of the detailed description and accompanying drawings.

BRIEF DESCRIPTION OF THE DRAWINGS

In the drawings, reference numbers may be reused to identify similar and/or identical elements.

DETAILED DESCRIPTION

Advanced rotary-wing aircraft designs, such as coaxial-rotor compound helicopters (an example shown in FIG. 1), may include coaxial rotors and auxiliary propulsion propellers that interact in unique and complex manners to generate complex vibrations. The vibrations generated by the propellers of fixed-wing aircraft and the rotors of rotary-wing aircraft may be transmitted to occupants (such as pilots, crew, and passengers) via the airframe and seats attached to the airframe. These vibrations can cause fatigue in human occupants for a variety of physiological reasons. For example, when subjected to vibration, humans often need to concentrate more intensely to perform tasks, which can result in mental fatigue. When subjected to vibrations, the human body may also instinctively try to stabilize itself through constant, involuntary muscle contractions. Vibrations can also lead to decreased blood circulation, particularly in the extremities. These responses and impacts can cause muscle fatigue, adding to fatigue. Combined, these and other physiological factors may result in cumulative fatigue, which can negatively affect both the mental and physical performance of the occupants.

Fatigue (such as fatigue caused by aircraft vibrations) can lead to a decline in the overall performance and cognitive abilities of its occupants. For example, vibration-related fatigue may impair cognitive abilities, leading to slower reaction times, reduced attention, reduced alertness, and negatively impact the short-term memory and the ability to recall important information. Fatigue can also negatively impact an occupant's communication abilities, spatial perception, motor skills, and coordination. Thus, reducing vibration-related fatigue for occupants (such as pilots and crew) can improve aviation safety, provide positive benefits for aircrew scheduling, and facilitate increased operational tempo.

Figure 1:
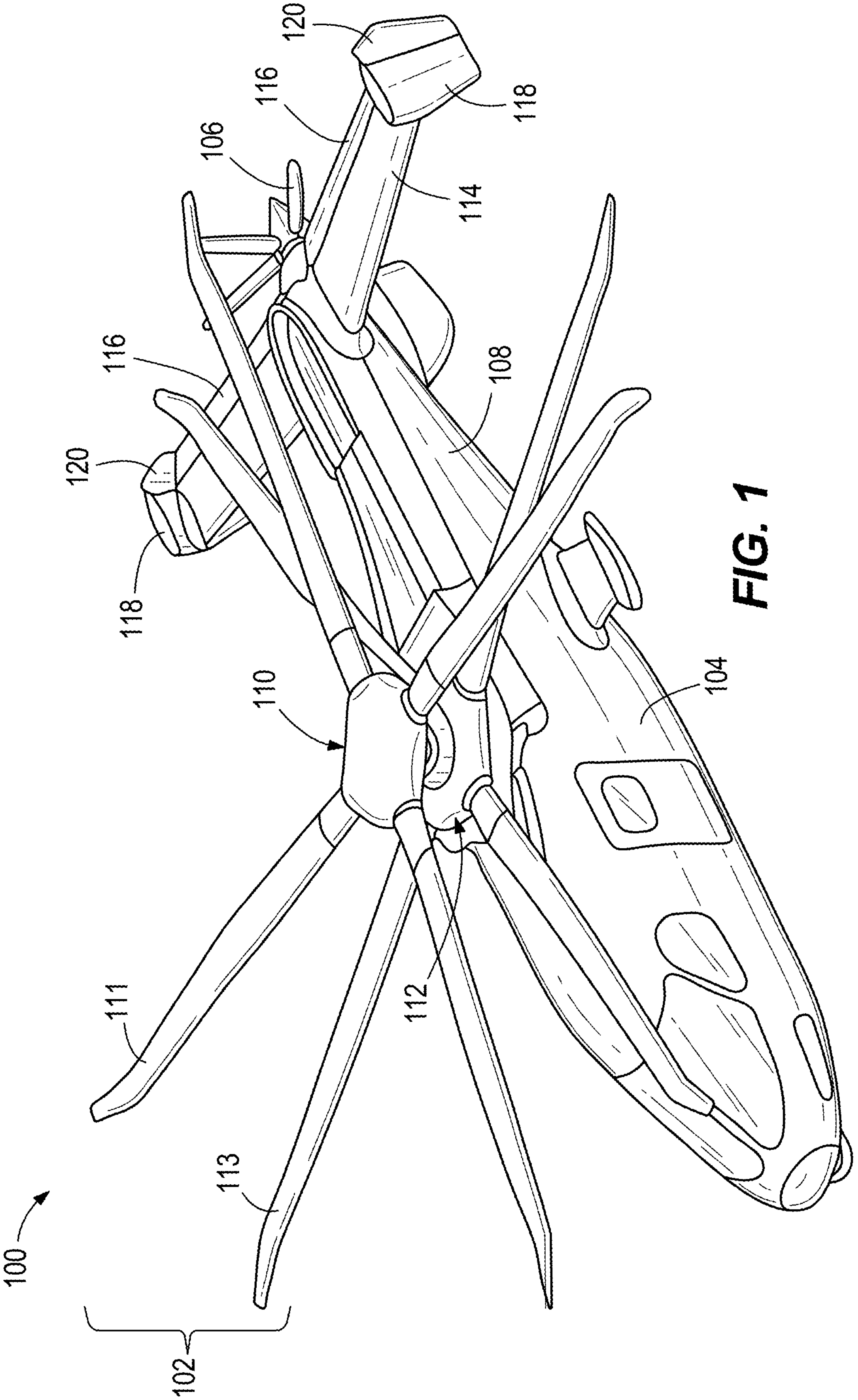
FIG. 1 is an isometric view of an aircraft.

FIG. 1 is an isometric view of an aircraft 100. In the example of FIG. 1, the aircraft 100 is a coaxial-rotor compound helicopter. Coaxial-rotor compound helicopters are an advanced type of rotary-wing aircraft that combine features of traditional helicopters with those of fixed-wing aircraft for improved performance over traditional single-rotor helicopters. For example, the aircraft 100 includes a coaxial main rotor system 102 rotatably coupled to a fuselage 104 and an auxiliary propulsion propeller 106 rotatably coupled to an empennage 108. In various implementations, the coaxial main rotor system 102 includes an upper rotor assembly 110 and a lower rotor assembly 112. The upper rotor assembly 110 includes a plurality of rotor blades 111 and the lower rotor assembly 112 includes a plurality of rotor blades 113. The upper rotor assembly 110 is positioned above the lower rotor assembly 112 and both share a common axis of rotation. The upper rotor assembly 110 and the lower rotor assembly 112 rotate in opposite directions, which cancels out the torque effect of each rotor assembly, eliminating the need for a tail rotor to counteract the torque. The coaxial arrangement of the upper rotor assembly 110 and the lower rotor assembly 112 also provides increased lift and efficiency compared to single-rotor designs.

The auxiliary propulsion propeller 106 provides forward thrust for the aircraft 100 and further enhances the performance of the coaxial-rotor compound helicopter. In addition to increasing the forward speed of the aircraft 100, the auxiliary propulsion propeller 106, when combined with the coaxial main rotor system 102, improves the overall efficiency of the aircraft 100. For example, while the coaxial main rotor system 102 may be efficient for vertical lift, it may not be optimized for high-speed horizontal flight. The auxiliary propulsion propeller 106 provides additional thrust in the forward direction of flight, taking on a significant portion of the forward-thrust responsibility during certain phases of flight (for example, during cruise). This allows for the coaxial main rotor system 102 to be operated at a more efficient lift-to-drag ratio, reducing fuel consumption and/or increasing range. Furthermore, the combined coaxial main rotor system 102 and auxiliary propulsion propeller 106 enhance the maneuverability of the aircraft 100. For example, by including a separate auxiliary propulsion propeller 106 for forward thrust, the coaxial main rotor system 102 may be optimized for superior hover and lift capabilities as well as yaw rates, while the auxiliary propulsion propeller 106 may be optimized for rapid forward acceleration and/or deceleration.

In various implementations, the aircraft 100 includes a horizontal stabilizer 114 attached to the empennage 108. In some examples, the horizontal stabilizer 114 includes elevators 116 at a trailing edge, which may be actuated to change the pitch of the aircraft 100. The horizontal stabilizer 114 provides longitudinal stability for the aircraft 100 and improves pitch control, particularly at the higher speeds coaxial-rotor compound helicopters may be capable of reaching. The horizontal stabilizer 114 provides natural stability in forward flight, reducing the pilot's workload. For example, the horizontal stabilizer 114 may be trimmed so that the aircraft 100 maintains a constant attitude without input from the pilot. The horizontal stabilizer 114 can also improve the aerodynamic efficiency of the aircraft 100 in forward flight by maintaining an optimal angle of attack for the coaxial main rotor system 102, which may reduce drag and increase fuel efficiency.

In some examples, the aircraft 100 includes one or more vertical stabilizers 118. For example, a vertical stabilizer 118 is attached at each outboard edge of the horizontal stabilizer 114. In various implementations, each vertical stabilizer 118 includes rudders 120 at a trailing edge, which may be actuated to change the yaw of the aircraft 100. The vertical stabilizers 118 provide directional stability for the aircraft 100, particularly at high speeds. For example, the vertical stabilizers 118 may dampen any residual yaw oscillations resulting from wind gusts or uneven lift distribution.

In a coaxial-rotor compound helicopter, interactions between the coaxial main rotor system 102 and the auxiliary propulsion propeller 106 can lead to complex vibration profiles. For example, as with the main rotor of a conventional helicopter and/or the propellers of a fixed-wing aircraft, each of the upper rotor assembly 110 and the lower rotor assembly 112 generates mechanical vibrations as a result of the uneven aerodynamic forces acting on the rotor blades 111 and 113 as the rotors spin. However, the aerodynamic interactions between the rotor blades 111 of the upper rotor assembly 110 and the rotor blades 113 of the lower rotor assembly 112 (such as blade-vortex interactions) can generate additional, complex vibrations-especially as the blades pass each other. As with the propellers of a fixed-wing aircraft, the auxiliary propulsion propeller 106 adds its own vibrations to the system. Furthermore, the aerodynamic interactions between the coaxial main rotor system 102 and the auxiliary propulsion propeller 106 can be aerodynamically complex. For example, the airflow from the main rotor system 102 may interact with the auxiliary propulsion propeller 106 to generate additional vibrations. As a result, the combination of vibrations from the coaxial main rotor system 102 and the auxiliary propulsion propeller 106 can lead to a compounded effect, where the overall vibration profile experienced at the airframe (for example, transmitted to the fuselage 104) may be more complex than the sum of its parts. This vibration profile may be delivered to occupants of the aircraft 100 via seats attached to the fuselage 104.

While the aircraft is shown in FIG. 1 as a coaxial-rotor compound helicopter, the aircraft 100 may be any type of fixed- or rotary-wing aircraft. For example, the aircraft 100 may be a propeller-driven fixed-wing aircraft, a conventional helicopter, a coaxial-rotor helicopter, a tiltrotor aircraft, or any other type of aircraft.

Figure 2:
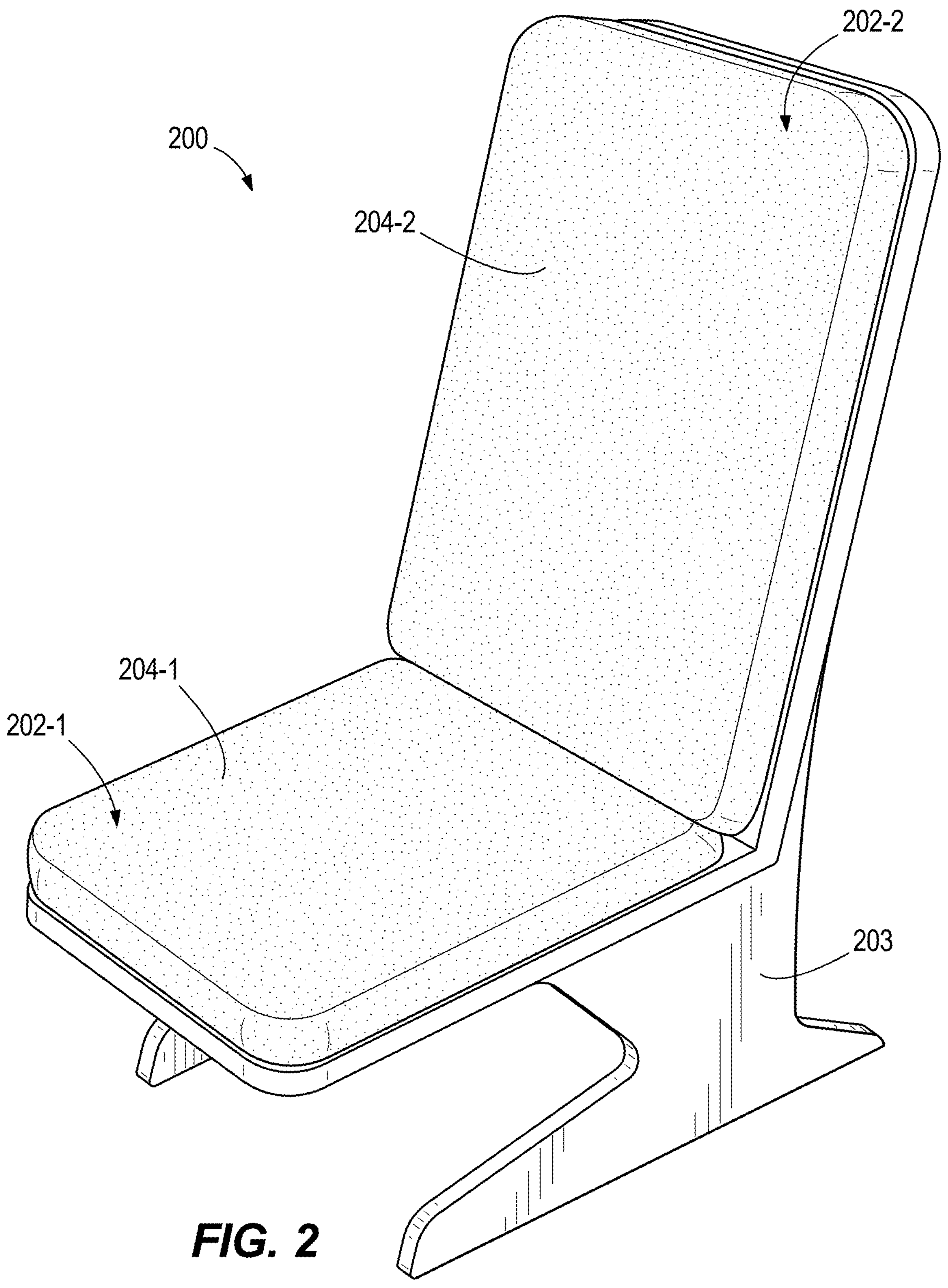
FIG. 2 is an isometric view of a vibration-canceling seating system for an aircraft.

FIG. 2 is an isometric view of a vibration-canceling seating system 200 for the aircraft 100. In various implementations, the seating system 200 includes one or more seat cushions 202. In the example of FIG. 2, the seating system 200 includes a horizontal seat or seat-bottom cushion 202-1 and a vertical seat or seat-back cushion 202-2. Each seat cushion 202 is attached to a seat frame 203, which is in turn connected to the fuselage 104. This seat attachment is shown connecting to the horizontal fuselage floor; however, it is also applicable to a vertical or canted fuselage bulkhead or post/rail support type mounting systems as well. As previously described, components of the aircraft 100 (such as the coaxial main rotor system 102 and/or the auxiliary propulsion propeller 106) may generate vibrations and transmit the vibrations to the seat frame via the fuselage 104. Each seat cushion 202 is positioned between the occupant and the seat frame and actively cancels out the vibrations at an occupant-facing surface 204 of the seat cushion 202 (seat-bottom surface 204-1 and seat-back surface 204-2). For example, each seat cushion 202 may detect the vibration at the surface 204 and generate an opposite motion at the surface 204 to destructively cancel the vibration.

Figure 3:
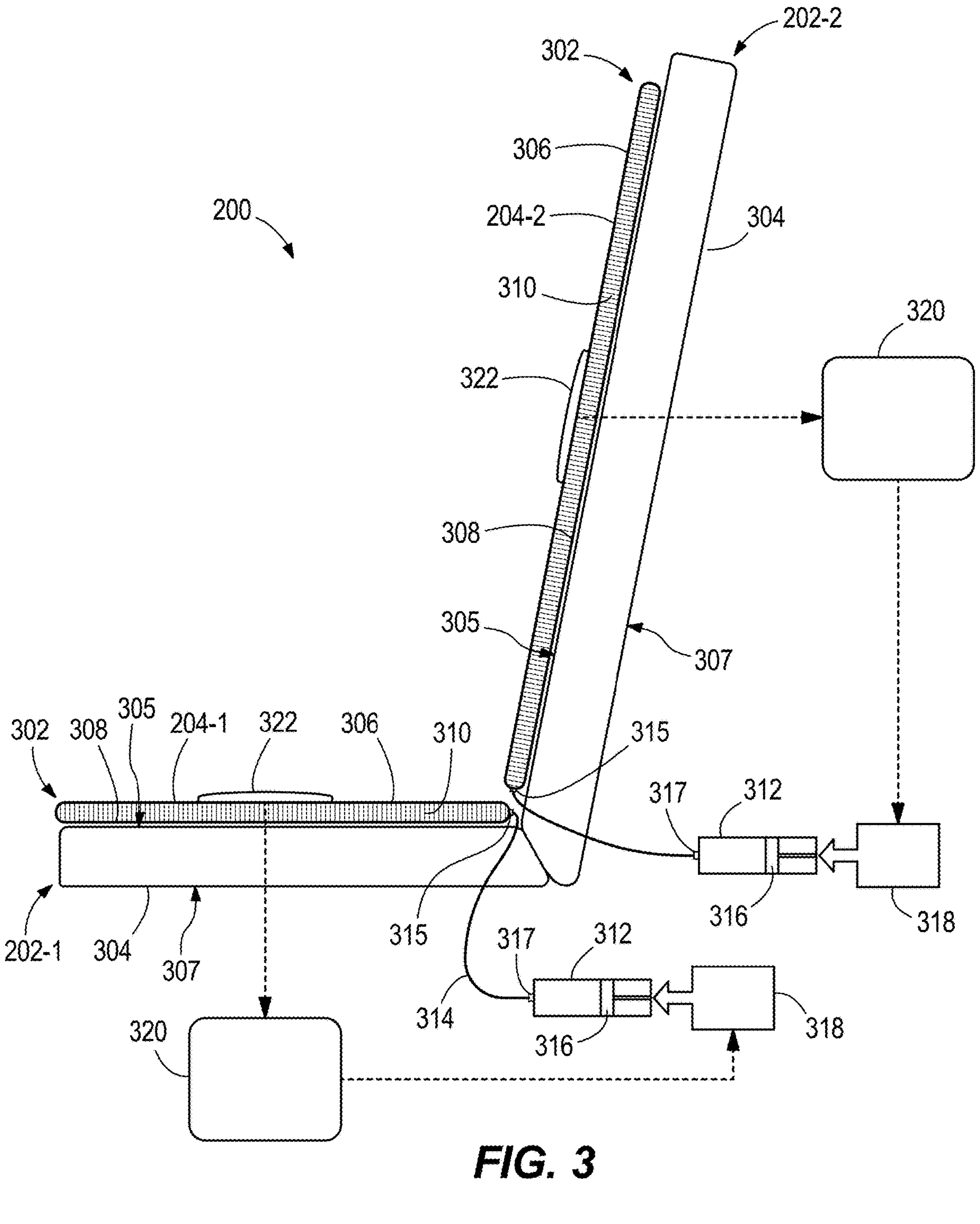
FIG. 3 is a cross-sectional view of the vibration-canceling seating system of FIG. 2.

FIG. 3 is a cross-sectional view of the vibration canceling seating system 200 of FIG. 2. In various implementations, each seat cushion 202 includes a vibration canceling structure 302 and a support layer 304. In some examples, vibration canceling structure 302 is formed from a flexible, substantially fluid-impermeable material defining a pouch. The vibration canceling structure 302 includes a first surface 306 opposite a second surface 308, and a cavity 310 formed between the first surface 306 and the second surface 308. In various implementations, the vibration canceling structure 302 is formed as a single continuous layer of material defining a cavity 310 between the first surface 306 and the second surface 308. In other examples, the vibration canceling structure 302 may be formed as two layers of material with the peripheries of the two layers joined to define a cavity between the first surface 306 and the second surface 308.

In various implementations, the vibration canceling structure 302 is substantially formed from (or partially formed from or includes) a polymer material, such as a high-density polyethylene (HDPE), a low-density polyethylene (LDPE), a polypropylene (PP), a polyvinyl chloride (PVC), a polyurethane (PU), a polycarbonate (PC), a polytetrafluoroethylene (PTFE), a fluoropolymer (PFA, FEP, etc.), an ethylene vinyl alcohol (EVOH), a polyethylene terephthalate (PET), a combination of the previous materials, etc. In some examples, the vibration canceling structure 302 is formed from (or partially formed from or includes) a carbon material, such as a carbon fiber, a graphene, etc. In the illustrated implementation, the cavity 310 is filled with a substantially incompressible fluid. For example, the substantially incompressible fluid may include a flame-resistant liquid such as water, a water-glycol solution, a phosphate ester, a silicone-based liquid, a fluorocarbon-based liquid, a halogenated hydrocarbon liquid, any combination of the previous liquids, etc.

In the illustrated example, the seat cushion 202 includes the support layer 304. The support layer 304 includes a first surface 305 opposite a second surface 307. In various implementations, the seat cushion 202 includes a material that distributes the occupant's weight across the first surface 305 and/or absorbs vibrations, shocks, and/or impacts transmitted through the seat frame 203. In some examples, the support layer 304 includes a high-density foam, a memory foam, a gel foam, a latex foam, a closed-cell foam, an aerogel, synthetic fibers, natural fibers, a combination of the previously described materials, etc. In other implementations, the seat cushion 202 does not include the support layer 304.

In some examples, the first surface 306 of the vibration canceling structure 302, the second surface 308 of the vibration canceling structure 302, the first surface 305 of the support layer 304, and/or the second surface 307 of the support layer 304 each form a substantially planar surface. In the illustrated implementation, the vibration canceling structure 302 and the support layer 304 are arranged so that the first surface 306 of the vibration canceling structure 302 and the first surface 305 of the support layer 304 face the occupant, while the second surface 308 of the vibration canceling structure 302 and the second surface 307 of the support layer 304 face away from the occupant. In the illustrated example, the second surface 308 of the vibration canceling structure 302 faces the first surface 305 of the support layer 304, and the first surface 306 of the vibration canceling structure 302 defines the occupant-facing surface 204. In other implementations, the vibration canceling structure 302 may be positioned so that the first surface 305 faces the second surface 307 of the support layer 304. In some examples, the vibration canceling structure 302 may be positioned so that it is at least partially contained within the support layer 304. In various implementations, the vibration canceling structure 302 and/or the support layer 304 may be covered with a protective covering and the portion of the protective covering facing the occupant may define the occupant-facing surface 204.

In the illustrated implementation, the vibration canceling structure 302 includes a fluid reservoir 312 that is fluidly coupled to the cavity 310 via a fluid channel 314. For example, the fluid channel 314 fluidly couples a port 315 of the vibration canceling structure 302 with a port 317 of the fluid reservoir 312. The fluid reservoir 312 and the fluid channel 314 are filled with the substantially incompressible fluid, and a piston 316 is disposed within the fluid reservoir 312. The piston 316 is in contact with the substantially incompressible fluid within the fluid reservoir 312, and the piston 316 is movable within the fluid reservoir 312. When the piston 316 moves towards or away from the substantially incompressible fluid, the piston 316 transmits a force over a surface area of the piston (for example, as a pressure) to the substantially incompressible fluid. When the piston 316 transmits the force to the substantially incompressible fluid over a time duration, the force is transmitted as an impulse. In various implementations, this force, pressure, or impulse transports the substantially incompressible fluid from the fluid reservoir 312 to the cavity 310 via the port 317, the fluid channel 314, and the port 315, or from the cavity 310 to the fluid reservoir 312 via the port 315, the fluid channel 314, and the port 317. For example, the piston 316 is connected to a force generator 318, such as a piston driver. The force generator 318 is operatively coupled to a controller 320. The controller 320 may control the force generator 318 to drive the piston 316 to impart a force to the incompressible fluid that transports the substantially incompressible fluid from the fluid reservoir 312 to the cavity via the fluid channel 314 or from the cavity 310 to the fluid reservoir 312 via the fluid channel 314.

While a piston driver is shown, other embodiments may also be envisioned to impart a force to the incompressible fluid as well. For example, in various implementations, the force generator 318 may be an electromagnetic actuator, a piezoelectric actuator, a hydraulic actuator, a pneumatic actuator, a rotary to linear motion converter that converts motion of a rotatory motor to linear motion, a pump, etc.

In the illustrated implementation, a sensor 322 is coupled to the first surface 306 of the vibration canceling structure 302, although in further implementations the sensor 322 may be coupled to the second surface 308, the support layer 304, and/or the seat frame 203. In some examples, the sensor 322 is configured to provide feedback indicative of the seat cushion 202 moving towards and/or away from the occupant. For example, depending on which element the sensor 322 is coupled to, the sensor 322 provides feedback indicative of movement of the occupant-facing surface 204 of the seat cushion 202, the first surface 306 of the vibration canceling structure 302, the second surface 308 of the vibration canceling structure 302, the first surface 305 of the support layer 304, the second surface 307 of the support layer 304, and/or the seat frame 203 towards and/or away from the occupant. In various implementations, the sensor 322 is an accelerometer, which measures an acceleration at the structure it is coupled to as it moves towards or away from the occupant. For example, the sensor 322 may be a capacitive accelerometer, a piezoelectric accelerometer, a micro-electro-mechanical systems (MEMS) accelerometer, a piezoresistive accelerometer, a servo (or force balance) accelerometer, a strain gauge accelerometer, a Hall effect accelerometer, an optical accelerometer, etc.

In some examples, the sensor 322 may measure a deformation or displacement of the structure it is coupled to as it moves towards or away from the occupant. For example, the sensor 322 may include a strain gauge, a linear variable differential transformer (LVDT), a piezoelectric sensor, a capacitive displacement sensor, a Hall effect sensor, etc. In various implementations, the sensor 322 may measure a strain at the structure it is coupled to, which may be indicative of the motion of the structure towards or away from the occupant. For example, the structure the sensor 322 is coupled to may stretch or compress along its surface as it moves, and the sensor 322 may measure the associated strain. In some examples, the sensor 322 may be a strain gauge, such as a foil strain gauge, a semiconductor strain gauge, a fiber optic strain sensor, a piezoresistive strain sensor, a capacitive strain sensor, etc. In various implementations, the sensor 322 may measure a force at the structure it is coupled to, which may be indicative of the motion of the structure towards or away from the occupant. For example, the structure the sensor 322 is coupled to may deform as it moves towards or away from the occupant, which results in changes in force measured at the sensor 322. In some examples, the sensor 322 may be a load cell, a piezoelectric force sensor, a capacitive force sensor, a resistive force sensor, an optical fiber sensor, etc.

In various implementations, the controller 320 monitors signals from the sensor 322 to determine vibrations occurring at the vibration canceling structure 302 (for example, at the first surface 306 or at the second surface 308). The controller 320 analyzes the vibrations and generates phased signals based on the vibrations. For example, the phased signals may include frequency and magnitude components that are out-of-phase with the vibrations (for example, about 180° out of phase). In various implementations, the phased signals may be out-of-phase with the vibrations. The controller 320 controls the force generator 318 to drive the piston 316 according to the phased signals. In various implementations, the force generator 318 drives the piston 316 to move the substantially incompressible fluid into and out of the cavity 310. When the substantially incompressible fluid is moved out of the cavity 310, the first surface 306 moves towards the second surface 308 (for example, in a direction away from the occupant). When the substantially incompressible fluid is moved into the cavity 310, the first surface 306 moves away from the second surface 308 (for example, in a direction towards the occupant). Since the phased signals are out-of-phase with the vibrations sensed at the sensor 322, the first surface 306 moves away from and towards the occupant in a manner that is also out-of-phase with the vibrations, destructively canceling out vibrations at the first surface 306.

Figure 4:
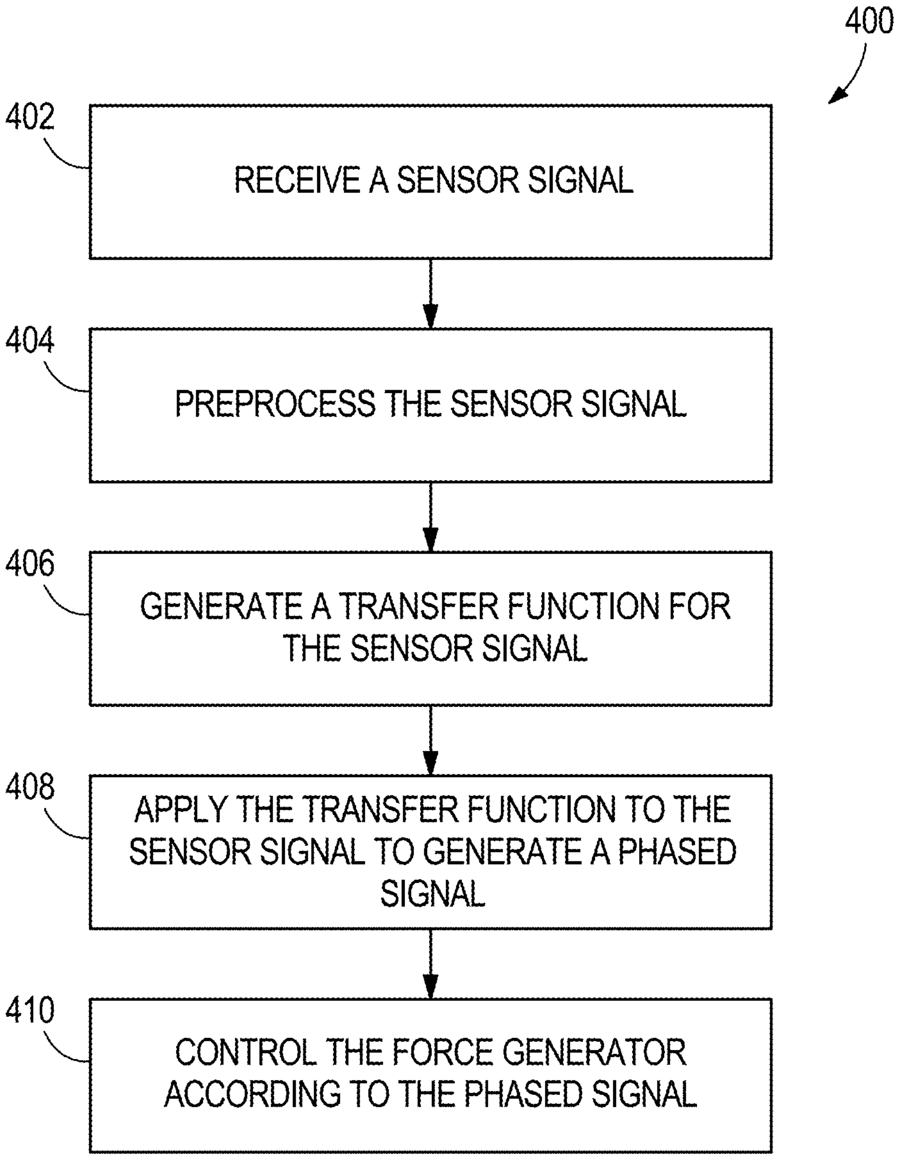
FIG. 4 is a flowchart of an example process for a controller to generate phased signals based on signals from a sensor.

FIG. 4 is a flowchart of an example process 400 for the controller 320 to generate phased signals based on signals from the sensor 322. At block 402, the controller 320 receives a sensor signal s(t) from the sensor 322. The sensor 322 may sense a range of vibration frequencies generated by various components of the aircraft 100, and the sensor signal s(t) corresponds to the entire range of frequencies. Thus, the sensor signal s(t) may represent a single-frequency signal or a multi-frequency signal. In various implementations, the sensor signal s(t) represents acceleration in a direction substantially orthogonal to the first surface 306 (e.g., facing the occupant), the second surface 308 (e.g., facing the occupant), or the occupant-facing surface 204 as a function of time t. In other examples, the sensor signals s(t) may represent a deformation, displacement, motion, strain, and/or force as a function of time t, which may represent a vibration at the first surface, the second surface 308, or the occupant-facing surface 204. Mathematically, sensor signal s(t) may be represented as equation (1) below, where A(t) represents an amplitude of the signal as a function of time t, f represents a frequency of the signal, and φ represents an initial phase of the signal:

$$s(t) = A(t) \cdot \cos(2\pi f t + \varphi) \tag{1}$$

At block 404, the controller 320 preprocesses the sensor signal s(t). In various implementations, the sensor 322 outputs an analog signal s(t), and the controller 320 converts the analog sensor signal s(t) to a digital sensor signal s[n]. For example, the controller 320 uses an analog-to-digital converter (ADC) to sample the analog sensor signal s(t) at discrete time intervals t=nT, where T is the sampling period and n is an integer representing the number of samples taken in each sampling period T. In various implementations, the sensor 322 may output a digital signal s[n] directly. In some examples, the controller 320 filters the digital signal s[n] to remove noise and/or irrelevant frequency components. For example, the controller 320 applies a band-pass filter to the digital signal s[n] to generate a filtered signal y[n].

At block 406, the controller 320 generates a transfer function H(f). In various implementations, the transfer function H(f) modifies the phase of the filtered signal y[n] by π radians (180°). In some examples, transfer function H(f) may be represented by equation (2) below:

$$H(f) = -1 \tag{2}$$

In various implementations, the transfer function H(f) may modify the phase of the filtered signal y[n] by any phase shift θ(f). In some examples, the phase shift θ(f) may be in a range of about 0 radians (0°) to about π radians (180°). In some examples, the transfer function H(f) may increase or decrease the amplitude of the filtered signal y[n] by an amplitude adjustment factor α. Accordingly, the transfer function H(f) may be represented by equation (3) below, where j is the imaginary unit:

$$H(f) = a \cdot e^{j \cdot \theta(f)} \tag{3}$$

At block 408, the controller 320 applies the transfer function H(f) to the filtered signal y[n] to generate a phased signal z[n]. The phased signal z[n] may represent a single-frequency signal or a multi-frequency signal. In various implementations, the phased signal z[n] may be represented by equation (4) below:

$$z[n] = H(f) \cdot y[n] \tag{4}$$

At block 410, the controller 320 controls the force generator 318 according to the piston phased signal z[n]. For example, the phased signal z[n] may be out-of-phase with the filtered signal y[n] such that the force generator 318 drives the piston 316 to impart an impulse to the substantially incompressible fluid that moves the first surface 306 out-of-phase with the vibration sensed by the sensor 322. This out-of-phase motion acts to cancel out vibrations at the first surface 306.

Because the force generator 318 imparts an impulse to the first surface 306 via the substantially incompressible fluid, the impulse will be transferred to the first surface 306 at the speed of sound in the substantially incompressible fluid. In practice, this transfer may be nearly instantaneous, eliminating latency in the system. Furthermore, the substantially incompressible fluid transfers the impulse to substantially the entirety of the first surface 306, allowing the substantial entirety of the first surface 306 to act as a piston. This provides even vibrational cancelation across the substantial entirety of the first surface 306, transmitting a greater amount of cancelation force to the occupant (for example, compared to designs that provide force generators directly coupled to seat cushions or seat frames, where the cancelation forces may be attenuated by the seat cushion or seat frame material). Additionally, by placing sensors at or near the first surface 306, technical solutions described in this specification measure vibration precisely where the occupant is experiencing the vibration (and where the vibration canceling impulse is imparted to the occupant), improving the effectiveness of the system.

Furthermore, the sensor 322 may be configured to sense a wide range of complex vibration frequencies generated by multiple sources of vibration of the aircraft 100 (for example, as previously described), and the controller 320 may generate a phased signal canceling frequency across the entire range. In various implementations, the vibration canceling system 200 may be provided as a modular system. In some examples, the vibration canceling system 200 may include the vibration canceling structure 302 (for example, including the first surface 306, the second surface 308, the fluid reservoir 312, the fluid channel 314, the piston 316, the force generator 318, the controller 320, and the sensor 322). In various implementations, the vibration canceling system 200 may include the vibration canceling system 200 and the support layer 304 (for example, provided as a complete seat cushion). This modularity allows for existing vehicles (for example, land vehicles, watercraft, aircraft, spacecraft, etc.) to be easily fitted or retrofitted with the vibration canceling system 200.

The foregoing description is merely illustrative in nature and does not limit the scope of the disclosure or its applications. The broad teachings of the disclosure may be implemented in many different ways. While the disclosure includes some particular examples, other modifications will become apparent upon a study of the drawings, the text of this specification, and the following claims. In the written description and the claims, one or more processes within any given method may be executed in a different order—or processes may be executed concurrently or in combination with each other—without altering the principles of this disclosure. Similarly, instructions stored in a non-transitory computer-readable medium may be executed in a different order—or concurrently—without altering the principles of this disclosure. Unless otherwise indicated, the numbering or other labeling of instructions or method steps is done for convenient reference and does not necessarily indicate a fixed sequencing or ordering.

Unless the context of their usage unambiguously indicates otherwise, the articles "a," "an," and "the" should not be interpreted to mean "only one." Rather, these articles should be interpreted to mean "at least one" or "one or more." Likewise, when the terms "the" or "said" are used to refer to a noun previously introduced by the indefinite article "a" or "an," the terms "the" or "said" should similarly be interpreted to mean "at least one" or "one or more" unless the context of their usage unambiguously indicates otherwise.

Spatial and functional relationships between elements—such as modules—are described using terms such as (but not limited to) "connected," "engaged," "interfaced," and/or "coupled." Unless explicitly described as being "direct," relationships between elements may be direct or include intervening elements. The phrase "at least one of A, B, and C" should be construed to indicate a logical relationship (A OR B OR C), where OR is a non-exclusive logical OR, and should not be construed to mean "at least one of A, at least one of B, and at least one of C." The term "set" does not necessarily exclude the empty set. For example, the term "set" may have zero elements. The term "subset" does not necessarily require a proper subset. For example, a "subset" of set A may be coextensive with set A, or include elements of set A. Furthermore, the term "subset" does not necessarily exclude the empty set.

In the figures, the directions of arrows generally demonstrate the flow of information—such as data or instructions. The direction of an arrow does not imply that information is not being transmitted in the reverse direction. For example, when information is sent from a first element to a second element, the arrow may point from the first element to the second element. However, the second element may send requests for data to the first element, and/or acknowledgements of receipt of information to the first element. Furthermore, while the figures illustrate a number of components and/or steps, any one or more of the components and/or steps may be omitted or duplicated, as suitable for the application and setting.

The term computer-readable medium does not encompass transitory electrical or electromagnetic signals or electromagnetic signals propagating through a medium—such as on an electromagnetic carrier wave. The term "computer-readable medium" is considered tangible and non-transitory. The functional blocks, flowchart elements, and message sequence charts described above serve as software specifications that can be translated into computer programs by the routine work of a skilled technician or programmer.

It should also be understood that although certain drawings illustrate hardware and software as being located within particular devices, these depictions are for illustrative purposes only. In some embodiments, the illustrated components may be combined or divided into separate software, firmware, and/or hardware. For example, instead of being located within and performed by a single electronic processor, logic and processing may be distributed among multiple electronic processors. Regardless of how they are combined or divided, hardware and software components may be located on the same computing device, or they may be distributed among different computing devices—such as computing devices interconnected by one or more networks or other communications systems.

In the claims, if an apparatus or system is claimed as including an electronic processor or other element configured in a certain manner, the claim or claimed element should be interpreted as meaning one or more electronic processors (or other element as appropriate). If the electronic processor (or other element) is described as being configured to make one or more determinations or one or execute one or more steps, the claim should be interpreted to mean that any combination of the one or more electronic processors (or any combination of the one or more other elements) may be configured to execute any combination of the one or more determinations (or one or more steps).

What is claimed is:

1. A vibration canceling system for an aircraft, comprising:
- a vibration canceling structure having a first surface opposite a second surface and a cavity between the first surface and the second surface, the cavity containing a substantially incompressible fluid;
- a force generator configured to transmit forces to the substantially incompressible fluid to move the first surface relative to the second surface;
- a sensor positioned at the first surface, the sensor configured to sense a motion of the first surface; and
- a controller configured to control the force generator to transmit a first force to the substantially incompressible fluid to move the first surface out of phase with the sensed motion.

2. The system of claim 1, further comprising:
- a reservoir fluidly coupled to the cavity, the reservoir including a portion of the substantially incompressible fluid;
- wherein the force generator is configured to transmit forces to the substantially incompressible fluid within the reservoir.

3. The system of claim 2, further comprising:
- a piston disposed within the reservoir;
- wherein the force generator is configured to drive the piston to transmit forces to the substantially incompressible fluid within the reservoir.

4. The system of claim 3, wherein the reservoir is fluidly coupled to the cavity via a fluid channel.

5. The system of claim 1, further comprising:
- a support layer;
- wherein the vibration canceling structure is configured to be positioned between the support layer and an occupant of the aircraft.

6. The system of claim 1, wherein the controller is configured to generate a transfer function based on a feedback signal from the sensor.

7. The system of claim 6, wherein the transfer function shifts a phase of the feedback signal.

8. The system of claim 7, wherein the controller is configured to apply the transfer function to the feedback signal to generate a phased signal.

9. The system of claim 8, wherein the controller is configured to control the force generator according to the phased signal, wherein the phased signal comprises at least one of a single-frequency signal and a multi-frequency signal.

10. The system of claim 9, wherein the feedback signal includes a range of frequencies indicative of vibration generated by components of the aircraft.

11. A method for canceling vibrations of an aircraft, comprising:
- sensing, at a sensor, motion at an occupant-facing surface of a vibration canceling system; and
- controlling, with a controller, a force generator to move the occupant-facing surface of the vibration canceling system out of phase with the sensed motion;
- wherein:
  - the vibration canceling system comprises a vibration canceling structure having a first surface opposite a second surface and a cavity between the first surface and the second surface,
  - the occupant-facing surface is the first surface,
  - the cavity contains a substantially incompressible fluid,
  - the force generator is configured to transmit forces to the substantially incompressible fluid to move the first surface relative to the second surface, and
  - the sensor is positioned at the first surface.

12. The method of claim 11, wherein:
- the vibration canceling system further comprises a reservoir fluidly coupled to the cavity, the reservoir including a portion of the substantially incompressible fluid; and
- the force generator is configured to transmit forces to the substantially incompressible fluid within the cavity.

13. The method of claim 12, wherein:

the vibration canceling system further comprises a piston disposed within the reservoir; and the force generator is configured to drive the piston to transmit forces to the substantially incompressible fluid within the reservoir.

14. The method of claim 13, wherein the reservoir is fluidly coupled to the cavity via a fluid channel.

15. The method of claim 11, wherein:

the vibration canceling system further comprises a support layer; and the vibration canceling structure is configured to be positioned between the support layer and an occupant of the aircraft.

16. The method of claim 11, further comprising generating, at the controller, a transfer function based on a feedback signal from the sensor.

17. The method of claim 16, wherein the transfer function shifts a phase of the feedback signal.

18. The method of claim 17, further comprising applying, at the controller, the transfer function to the feedback signal to generate a phased signal.

19. The method of claim 18, further comprising controlling, at the controller, the force generator according to the phased signal, wherein the phased signal comprises at least one of a single-frequency signal and a multi-frequency signal.

20. The method of claim 19, wherein the feedback signal includes a range of frequencies indicative of vibration generated by components of the aircraft.

* * * * *